(12) United States Patent
Kisaka et al.

(10) Patent No.: US 6,678,605 B2
(45) Date of Patent: Jan. 13, 2004

(54) CONTROL SYSTEM FOR INTERNAL COMBUSTION ENGINE

(75) Inventors: Hiroyuki Kisaka, Hiroshima (JP);
Yoshiyuki Shinya, Hiroshima (JP);
Shingo Harada, Hiroshima (JP);
Akitomo Kume, Hiroshima (JP)

(73) Assignee: Mazda Motor Corporation, Hiroshma (JP)

( * ) Notice: Subject to any disclaimer, the term of this patent is extended or adjusted under 35 U.S.C. 154(b) by 33 days.

(21) Appl. No.: 10/152,990

(22) Filed: May 23, 2002

(65) Prior Publication Data

US 2003/0116130 A1 Jun. 26, 2003

(30) Foreign Application Priority Data

| May 25, 2001 | (JP) | ........................................ 2001-156824 |
| May 25, 2001 | (JP) | ........................................ 2001-157071 |
| May 25, 2001 | (JP) | ........................................ 2001-157170 |
| Feb. 13, 2002 | (JP) | ........................................ 2002-035960 |

(51) Int. Cl.$^7$ .............................................. G06F 19/00
(52) U.S. Cl. .......................... 701/111; 701/110; 123/350
(58) Field of Search ................................ 701/103, 104, 701/105, 110, 111; 123/350

(56) References Cited

U.S. PATENT DOCUMENTS

| 4,750,103 A | * | 6/1988 | Abo et al. ................... 701/111 |
| 5,361,231 A | * | 11/1994 | Hayano ....................... 365/200 |
| 5,369,581 A | * | 11/1994 | Ohsuga et al. ................ 701/48 |
| 5,862,506 A | * | 1/1999 | Lynch et al. ................. 701/111 |

FOREIGN PATENT DOCUMENTS

JP        8-232696 A      9/1996

\* cited by examiner

*Primary Examiner*—John Kwon
(74) *Attorney, Agent, or Firm*—Nixon Peabody LLP; Donald R. Studebaker (57) ABSTRACT

An engine control system for diminishing driveline vibrations extracts resonant frequency component coincident in frequency with a driveline resonant vibration according to a gear ratio of a transmission of the driveline from a change in charging efficiency with time that is detected on the basis of a signal representative of an amount of intake air, converts the resonant frequency component to a demanded amount of engine torque reduction after having adjusted the resonant frequency component in phase, and causes the demanded amount of engine torque reduction by retarding an ignition timing and/or reducing an amount of fuel injection.

12 Claims, 7 Drawing Sheets

CONTROL SYSTEM FOR INTERNAL COMBUSTION ENGINE

BACKGROUND OF THE INVENTION

1. Field of the Invention

The present invention relates to a control system for an engine mounted on a vehicle, and, more particularly, to engine control system for reducing vibrations of a driveline including an engine.

2. Description of Related Art

Motor vehicles often cause discomfort vibrations from a driveline during acceleration that imposes an increasing load on an engine. Such a discomfort vibration occurs resulting mainly from torsional vibration in a driveline, in particular a drive shaft, of the vehicle when engine dynamic torque, that increases as an engine load increases, contains a torque component coincident in frequency with a driveline resonant torsional vibration which is hereafter referred to as a resonant frequency torque component. The driveline resonant torsional frequency typically depends upon a gear ratio of a transmission of the driveline. It has been proposed with an attempt to reduce discomfort vibrations occurring in the driveline in, for example, Japanese Unexamined Patent Publication No. 8-232696 to reduce engine torque by reducing an amount of fuel supply to the engine in a specific pattern of acceleration where the engine dynamic torque results in containing a resonant frequency torque component depending upon a gear ratio of a transmission of the driveline, in other words, in a specific pattern of engine operation where an engine dynamic load increases in a specific pattern. It has also been proposed in that publication to cause the reduction of fuel supply with a delay by approximately one revolution of engine from a point of time at which an occurrence of the specific pattern of acceleration is detected.

In the prior art engine control system disclosed in the publication, there are established several typical patterns of acceleration where engine dynamic torque results in containing a resonant frequency torque component. The engine control system executes the torque reduction control for the purpose of reducing driveline torsional vibrations on condition that it is detected that the engine has entered one of the patterns of acceleration.

However, there are conceivably innumerable patterns of acceleration where engine dynamic torque results in containing a resonant frequency torque component. When taking the fact that the driveline resonant torsional frequency varies depending upon a transmission gear ratio, in addition to the innumerable patterns of acceleration, into account, there is still room for improvement in sufficiently reducing driveline torsional vibrations. That is, even when the engine is operating in a certain pattern of acceleration in which the engine dynamic torque contains a resonant frequency torque component, the control of engine torque reduction is not achieved unless the pattern of acceleration is one of the specific patterns of acceleration as having been established. Accordingly, there are a great number of chances for the driveline to produce torsional vibrations.

SUMMARY OF THE INVENTION

It is an object of the present invention to provide an engine control system for reliably reducing driveline torsional vibrations during acceleration.

The above object of the present invention is accomplished by an engine control system for controlling an internal combustion engine mounted on a vehicle that is operative basically to predict, at the beginning of acceleration, a change in a value relating to an engine load that is expected to be imposed on an engine during the acceleration with time, to extract a component of the change coincident in frequency with a driveline resonant torsional vibration (which is referred to as a resonant frequency component) and to reduce engine torque by an amount meeting to the resonant frequency component.

Specifically, the engine control system comprises throttle opening detection means for detecting a throttle opening of the engine, rotational speed detection means for detecting a rotational speed of the engine, and control means that includes prediction means for predicting an engine load and a change in the engine load with time in a specified period of time from an occurrence of driver's operation for causing an increase in throttle opening on the basis of the throttle opening and the rotational speed when the occurrence of driver's operation is detected on the basis of a result of detection by the throttle opening detection means, filter means for extracting a resonant frequency component that is coincide with a resonant frequency of a driveline of the vehicle from of the change in engine load predicted by the prediction means, and control means for performing torque reduction control which diminishes engine torque by an amount meeting the resonant frequency component at a specified torque reduction timing corresponding to an occurrence of the resonant frequency component.

The throttle opening may be detected in the form of, for example, an accelerator position or travel. The rotational speed of engine may be detected in the form of, for example, a vehicle speed or a rotational speed of turbine of a torque converter. Further, the engine load may be detected in the form of a charging efficiency. The specified torque reduction timing may be a point of time after a lapse of specified time from stepping on an accelerator pedal.

According to an embodiment of the engine control system, because engine torque is reduced by an amount meeting a resonant frequency component of a change in engine load with time during acceleration that is predicted at the beginning of the acceleration, while acceleration during which driveline torsional vibrations occur due to the resonant frequency component can be reliably detected, the driveline torsional vibration due to the resonant frequency component is reliably diminished. Although it is conceivably possible to reduce engine torque when detecting vehicle body vibrations through feedback control, such feedback control includes a problem of responsiveness because it is too late to reduce engine torque following detection of vehicle body vibrations and is, as a matter of fact, hardly employable for engine control systems.

In the engine control system, the specified torque reduction timing may be changed according to the rotational speed of engine so as thereby to cause a reduction in engine torque earlier. More specifically, the specified torque reduction timing is changed by a degree of advance that is made greater with a drop in the rotational speed of engine. This prevents reduction of engine torque from being performed with a time lag due to a delay in calculation when the rotational speed of engine is comparatively low and, as a result, reliably diminishes the driveline torsional vibration due to the resonant frequency component.

The control means may interrupt the torque reduction control when an engine load is lower than a specified value. This is more desirable in terms of simplifying the torque reduction control and satisfying an acceleration demand because driveline torsional vibrations are practically insignificant while an engine load is low from the outset.

In the case where a continuously variable transmission is installed in the driveline, the control means diminishes a reduction in engine torque by an amount meeting inertia in the continuously variable transmission when the continuously variable transmission varies a gear ratio thereof This is because, while the continuously variable transmission is generally controlled to shift a gear toward a lower gear during acceleration, the continuously variable transmission dissipates engine torque during the gear shift. The demanded amount of engine torque reduction is more optimized for diminishing driveline torsional vibrations by diminishing the engine torque reduction by an amount meeting the dissipation of engine torque during the gear shift.

According to another embodiment of the engine control system, the control means performs the torque reduction control by retarding an ignition timing when the demanded amount of engine torque reduction is smaller than a first specified amount, performs the torque reduction control by cutting fuel injection when the demanded amount of engine torque reduction is larger than a second specified amount that is larger than the first specified amount, and performs the torque reduction control at the specified torque reduction timing by only retarding the ignition timing and further causes an increases in engine torque at a timing later than the specified torque reduction timing so as to diminish an engine torque fall occurring immediately after an engine torque rise occurring due to the resonant frequency component when the demanded amount of engine torque reduction is between the first and the second specified amount.

The engine control system thus structured achieves the reduction of engine torque with high precision by retarding the ignition timing when the demanded amount of engine torque reduction is smaller than the first specified amount and reduces engine torque sufficiently by cutting fuel injection when the demanded amount of engine torque reduction is larger than the second specified amount. Further, the engine control system prevents or sufficiently diminishes accelerative torsional vibrations by increasing engine torque so as to make up a torque fall out of fluctuations of the resonant frequency component when the demanded amount of engine torque reduction is between the first and the second specified amount.

In this instance, when the demanded amount of engine torque reduction is between the first and the second specified amount, the control means makes a first torque rise occurring at the beginning of acceleration as small as possible by changing the ignition timing by the greatest degree of retardation and, in consequence, significantly diminishing a torque fall immediately after the first torque rise. This diminishes accelerative vibrations effectively on the whole. Furthermore, the engine control system causes an increases in engine torque meeting a difference of a demanded amount of engine torque reduction resulting from changing the ignition timing by the greatest degree of retardation from the demanded amount of engine torque reduction meeting the resonant frequency component. This makes it easier to set an amount of engine torque increase. The increase of engine torque may be achieved by either making an air-fuel ratio leaner or increasing an amount of intake air. This is desirable to realize the engine torque increase simply and precisely.

According to still another embodiment of the engine control system, the control means achieves the demanded amount of engine torque reduction meeting the resonant frequency component by making an air-fuel ratio leaner when an air-fuel ratio after having been made as lean as necessary to cause the demanded amount of engine torque reduction is out of a specific range of air-fuel ratio for a level of NOx emission in an exhaust gas higher than a specified level and, on the other hand and by retarding an ignition timing when the air-fuel ratio after having been made as lean as necessary to cause the demanded amount of engine torque reduction is within the specific range of air-fuel ratio.

More specifically, the engine control system performs the torque reduction control with a specific air-fuel ratio on a leaner side from the specific range of air-fuel ratio when the air-fuel ratio after having been made as lean as necessary to cause the demanded amount of engine torque reduction is leaner than the specified air-fuel ratio and further performs the torque reduction control by retarding an ignition timing so as to make up a shortage of engine torque reduction when the torque reduction control with the specific air-fuel ratio causes the shortage of engine torque reduction relative to the demanded amount of engine torque reduction. Further, the engine control system performs the torque reduction control by cutting fuel injection when a total amount of engine torque reduction of both amounts of engine torque reduction resulting from the torque reduction control by using the specific air-fuel ratio and the torque reduction control by retarding an ignition timing is smaller than the demanded amount of engine torque reduction.

The engine control system thus structured performs the reduction of engine torque for diminishing accelerative vibrations by making utilization of a lean air-fuel ratio that is advantageous to improvement of fuel efficiency and, on the other hand, prevents or significantly suppresses an increase in NOx emission by making utilization of a retardation of ignition timing.

BRIEF DESCRIPTION OF THE DRAWINGS

The above and other objects and features of the present invention will be clearly understood from the following detailed description when read with reference to the accompanying drawings, wherein the same numeral numbers have been used to denote same or similar parts or mechanisms throughout the drawings and in which.

DETAILED DESCRIPTION OF THE PREFERRED EMBODIMENTS

Figure 1:
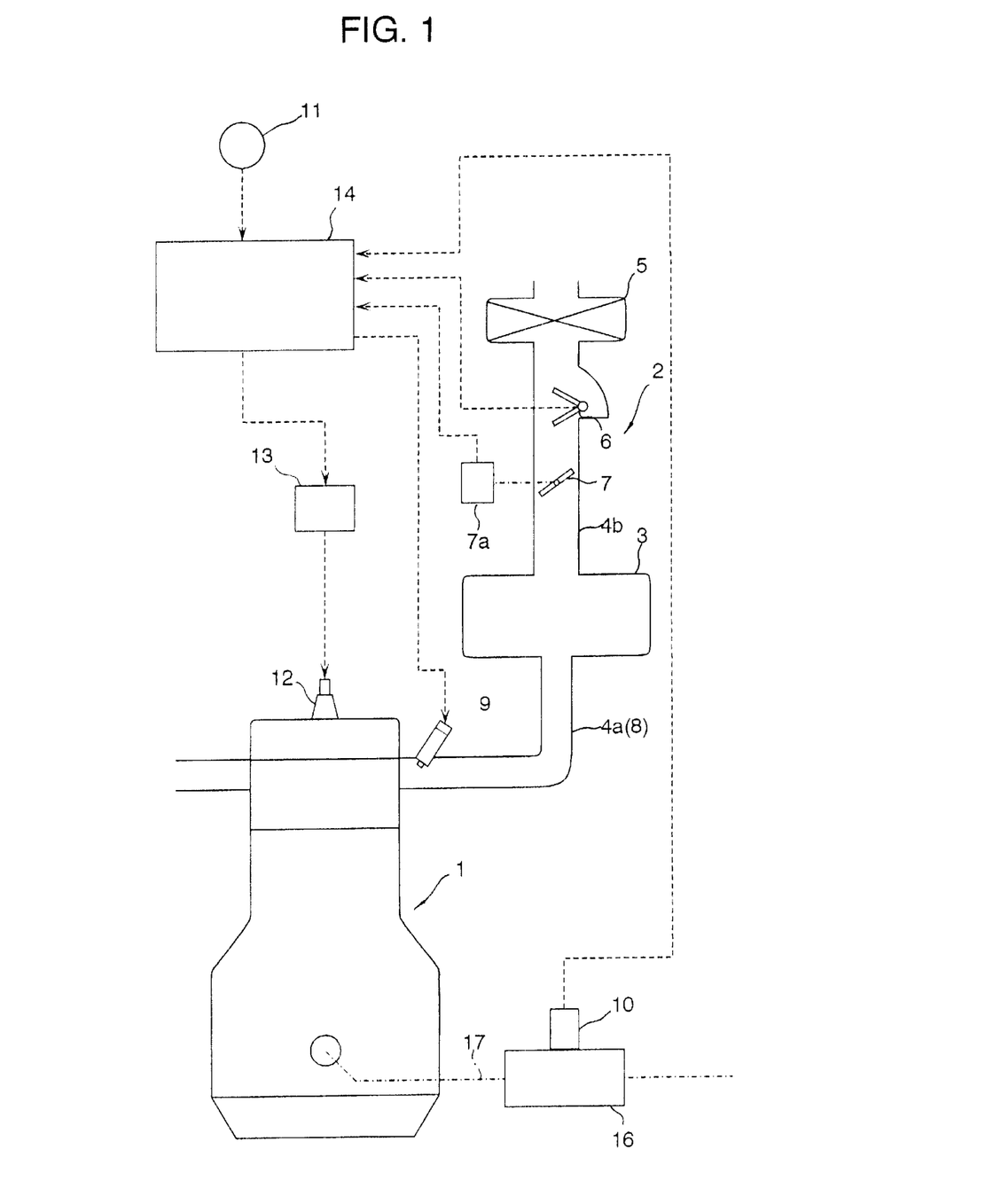
FIG. 1 is a schematic systematic view showing an overall control system installed to an engine.

Referring to the drawings in detail and, in particular, to FIG. 1 showing an multiple cylinder internal combustion engine 1, such as for example a spark ignition type in-line four cylinder engine, (which is hereafter referred to as an engine for simplicity), the engine 1 is equipped with spark plugs 12, one for each cylinder, and an intake line 2. The intake line 2 includes an intake manifold 4a comprising discrete intake passages 8, one for each cylinder, a surge tank 3 to which the discrete intake passages are joined together and a common intake passage 4b connected to the surge tank 3b. The discrete intake passages 8 are provided with fuel injectors 9, respectively. The common intake passage 4b is provided with an air cleaner 5, an airflow sensor 6 and a throttle valve 7 arranged in this order from the upstream end to the downstream end. The throttle valve 7 is equipped with a position sensor 7a operative to detect a throttle opening of the throttle valve 7 that is representative of a value relating to an accelerator position.

An engine control unit 14 that comprises a microcomputer, performs various control including at least control of reducing torque (which is hereafter referred to as the torque reduction control) and the control of ignition timing. Specifically, the engine control unit 14 receives various signals including a signal representative of an amount of intake air (an intake air signal) from the air flow sensor 6 that is used as a value relating to an engine load, a signal representative of a throttle position (a throttle position signal) from the position sensor 7a, a signal representative of a rotational speed of engine (an engine speed signal) from a speed sensor 10 and a signal representative of a gear ratio (a gear ratio signal) from a gear position sensor 11 that is attached to a transmission 16 installed in a driveline 17. The engine control unit 14 provides at least the fuel injectors 9 and the ignition system 13 with control signals, respectively, on the basis of the signals input thereto. That is, the engine control unit 14 provides each of the fuel injector 9 with a fuel injection control signal for controlling an amount of fuel that the fuel injector 9 sprays into the cylinder through the discrete intake passage 8 during implementation of the torque reduction control and the spark plug 13 with an ignition timing control signal for controlling an ignition timing at which the spark plug 13 is excited to fire fuel charge.

Figure 2:
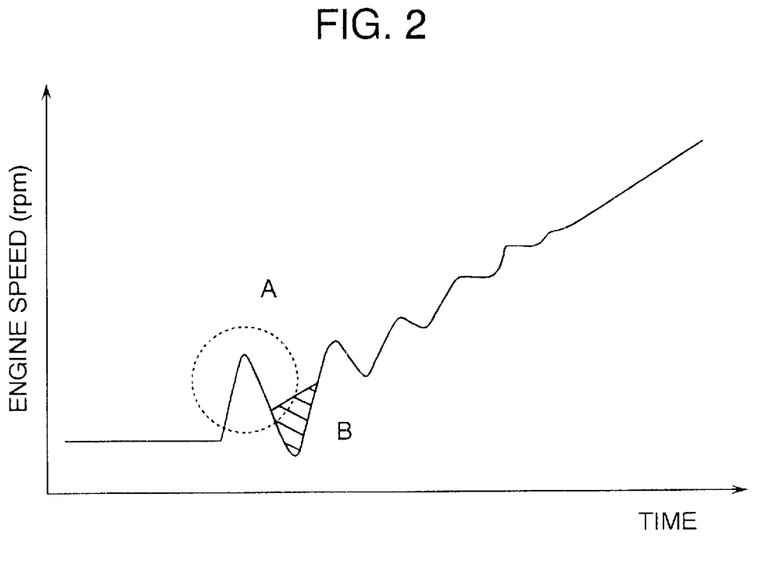
FIG. 2 is a diagram showing torque fluctuations resulting driveline torsional vibrations during acceleration.

Reference is made of FIG. 2 for the purpose of providing a brief background that will enhance an understanding of the operation of the torque reduction control for reducing torsional vibrations of the driveline 17.

FIG. 2 shows a rotational speed of engine containing fluctuations (which are equivalent to fluctuations of engine dynamic torque or fluctuations of longitudinal acceleration and represent vehicle vibrations) in the case of step response engine operation that refers to engine operation resulting from stepping on an accelerator pedal at a stretch. When the accelerator pedal is stepped on so as to cause step response engine operation, the engine dynamic torque contains almost all torque components and, inconsequence, contains resonant frequency torque components, so that there occurs a great torque fluctuation, namely a great torque raise, at the beginning of acceleration. In particular, as shown by a reference symbol A in FIG. 2, a first torque rise occurring at the beginning of acceleration that is significantly great results from discomfort driveline resonant torsional vibrations. Therefore, preventing an occurrence of a great torque rise at the beginning of acceleration results in preventing or significantly suppressing an occurrence of a great torque fall immediately after the first torque rise, so as to be effective in effectively reducing the discomfort driveline torsional vibrations.

Figure 3:
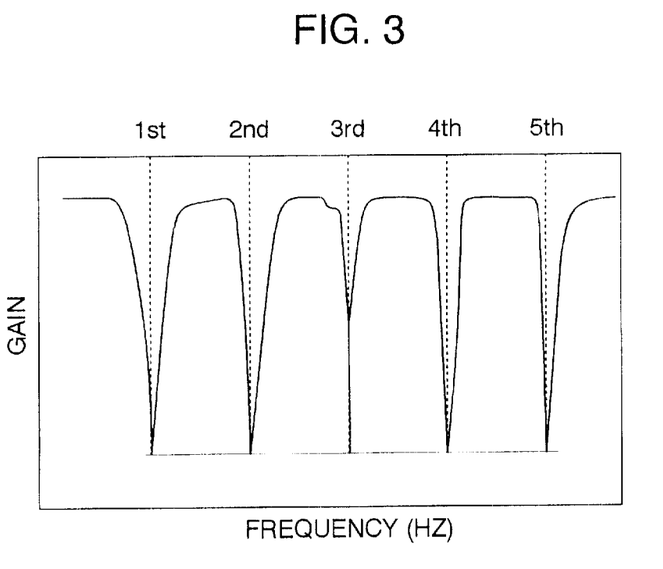
FIG. 3 is a diagram showing resonant frequencies of a driveline according to gear positions.

FIG. 3 shows resonant frequencies of the driveline for possible gear positions by way of example. As shown, the driveline resonant frequency is approximately 2 Hz for a $1^{st}$ gear, 4 Hz for a $2^{nd}$ gear, 6 Hz for a $3^{rd}$ gear, 8 Hz for a $4^{th}$ gear and 10 Hz for a $5^{th}$ gear. The engine dynamic torque conceivably contains torque components coincident in frequency with all of the driveline resonant torsional vibrations of 2 Hz to 10 Hz in an event of the step response engine operation. In order to avoid an occurrence of resonant torsional vibrations in the driveline 17 during acceleration, the engine control unit 14 extracts a torque component coincident in frequency with a driveline resonant torsional vibration, namely a resonant frequency torque component, depending on a gear ratio of the transmission 16 in a selected gear position from a change in the amount of intake air with time that is represented by an intake air signal and is predicted at the beginning of acceleration and subsequently performs the torque reduction control so as to cause a reduction in engine torque meeting the resonant frequency torque component after having made an adjustment in phase of the resonant frequency torque component correspondingly to an operational delay so as to accord with the reduction in engine torque.

Figure 4:
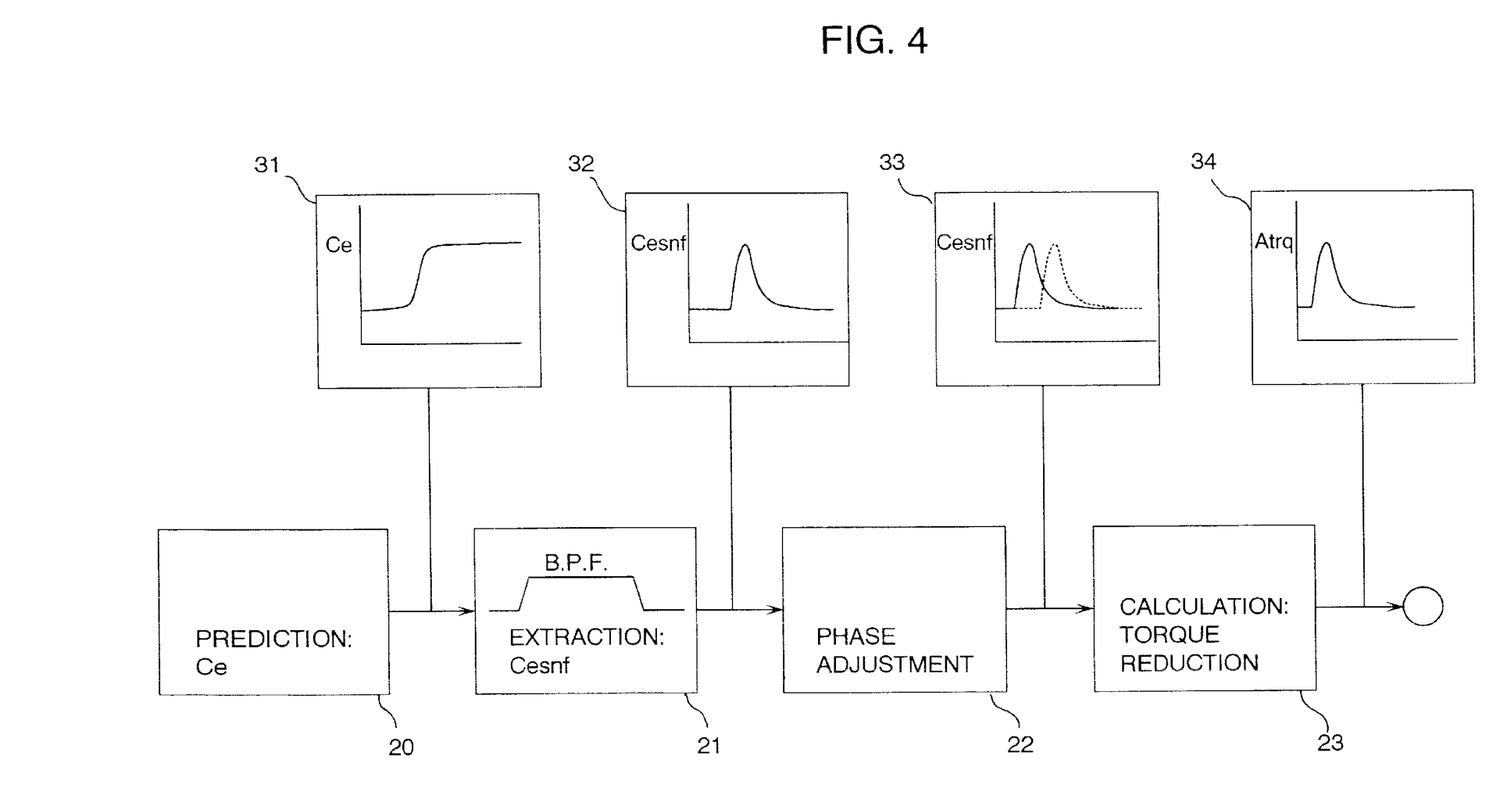
FIG. 4 is a block diagram illustrating control contents of the control system according to an embodiment of the present invention.

FIG. 4 diagrammatically illustrates functional operation of the torque reduction control. In FIG. 4, time T is indicated as a point of time from a point of time at which fuel injection is implemented. As shown, prediction means 20 predicts a change in charging efficiency Ce with time on the basis of an intake air signal from the airflow sensor 6 and provides an output representative of the resultant change in charging efficiency (shown in a chart 31). The output is passed through a band pass filter 21 having filter factors that are altered so as to extract a resonant frequency torque component dependent upon a gear ratio of the transmission 16 in a selected gear position. The filtered output, shown in a chart 32, represents resonant frequency torque component Cesnf that is defined in the form of a torque ratio of a change in engine torque causing a shock resulting from a driveline resonant vibration relative to an overall change in engine torque in a specified period of time from an occurrence of driver's operation for causing an increase in throttle opening.

The output from the band pass filter 21 is advanced in phase through phase adjusting means 22 as shown in chart 33 in order to compensate a delay of the timing at which the torque reduction control is implemented and that is caused resulting from the calculation of the torque ratio. This phase adjustment is desirably performed by using a rotational speed of engine as a parameter. For example, the degree of advance in phase of the output is made greater so as to cause an engine torque reduction earlier as the rotational speed of engine becomes lower. This is, although, on one hand, a timing of fuel injection and a timing of ignition are usually determined on the basis of a rotational speed of engine, the rotational speed of engine itself is usually calculated on the basis of a generative cycle of a pulse that is generated every one revolution of engine. Therefore, since a response delay of control due to the calculation becomes large resulting from the pulse generative cycle getting longer as the rotational speed of engine becomes lower, the degree of advance in phase of the output is made greater as a rotational speed of engine becomes lower.

After having adjusted the output in phase, torque conversion means 23 determines an amount of torque reduction Atrq meeting the resonant frequency torque component Cesnf as shown in chart 34. The engine torque may be reduced by retarding an ignition timing and reducing an amount of fuel injection, independently or in combination if desirable. The amount of torque reduction may be further corrected on the basis of a value relating to a stepping speed of accelerator (i.e. a changing rate of accelerator travel or a changing rate of throttle opening) so as to become smaller as the stepping speed of accelerator becomes higher and may be fixed to zero when the stepping speed of accelerator exceeds a specified speed. This correction of the amount of torque reduction on the basis of a stepping speed of accelerator guarantees a reliable increase in engine torque upon an occurrence of a driver's demand for an engine torque increase, so as thereby to prevent the driver from feeling unpleasant torque control.

Figure 5:
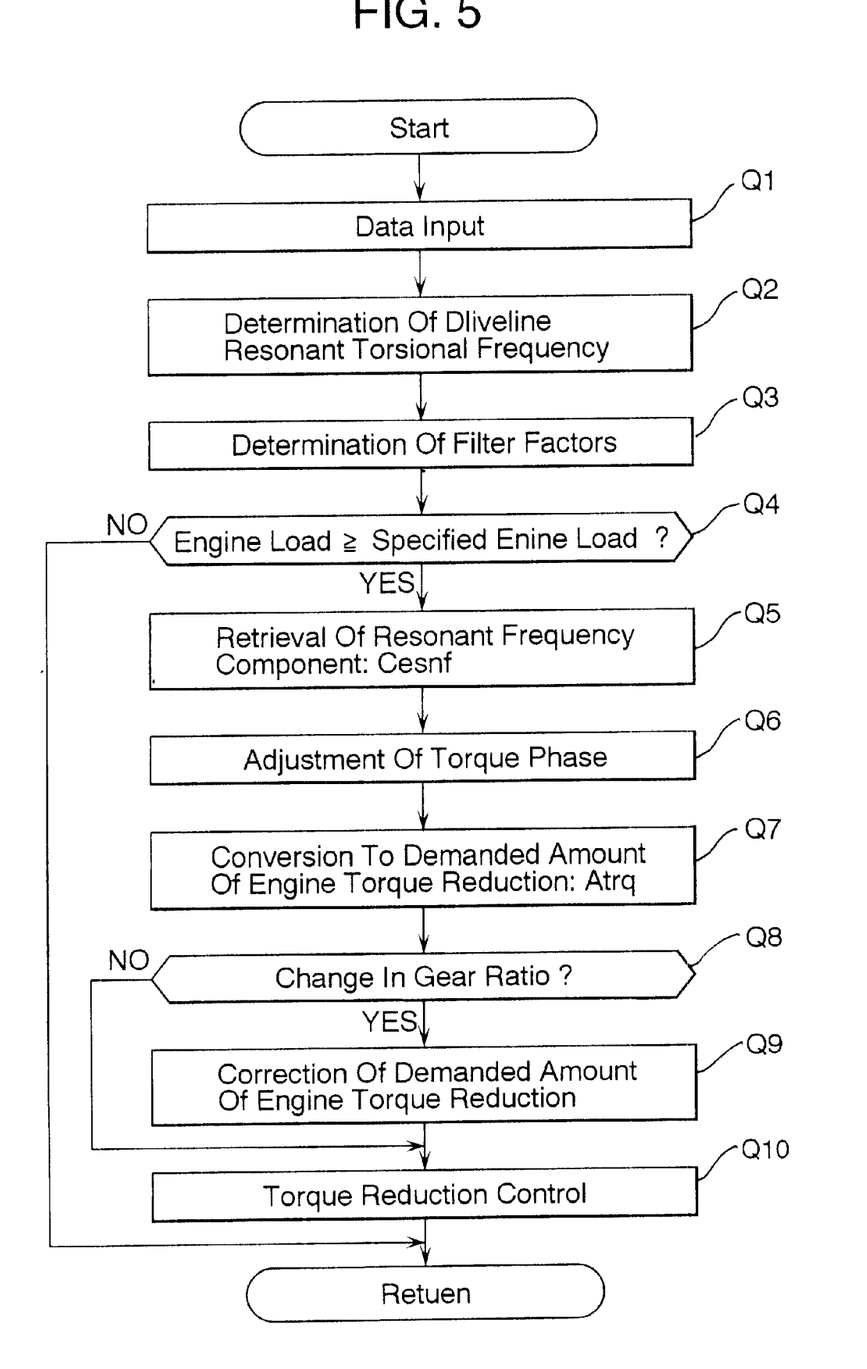
FIG. 5 is a flow chart illustrating a general routine of torque reduction control.

FIG. 5 is a flow chart illustrating a general sequence routine of the torque reduction control functionally illustrated in block diagram in FIG. 4. When the sequence logic commences and control proceeds to a function block at step Q1 where various signals including at least an intake air signal, an engine speed signal, a gear ratio signal and a throttle position signal are input. Subsequently, a driveline resonant torsional frequency that meets a gear ratio of the transmission 16 in a selected gear position is determined by referring a prescribed map that defines driveline resonant torsional frequencies with respect gear positions at step Q2, and filter factors of the band pass filter 21 are varied according to the driveline resonant torsional frequency and the rotational speed of engine at step Q3. The filter factors define a center resonant frequency and band widths at opposite side of the center resonant frequency of the band pass filter 21. The band pass filter 21 is known in various forms and may take any well known form such as, for example, a two-dimensional digital filter having a transfer function H(z) that is expressed using five filter factors a0, a1, a2, b1 and b2 as follows:

$$H(z)=(a0 \cdot z^{-2}+a1 \cdot z+a2)/(z^{-2}+b1 \cdot z+b2)$$

Subsequently, at step Q4, a judgment is made as to whether an engine load, that is represented by the amount of intake air, is equal to or higher than a specified engine load. When the answer is negative, i.e. when the engine load is lower than the specified engine load, this indicates that it is not necessary to implement the torque reduction control, then, the sequence logic returns without implementing the torque reduction control. On the other hand, when the answer is negative, i.e. when the engine load is equal to or higher than the specified engine load, the output from the prediction means 20 is passed through the band pass filter 22 so as thereby to retrieve a resonant frequency torque component Cesnf meeting the gear ratio of the transmission 16 in the selected gear position at step Q5. After shifting or advancing the output representing the resonant frequency torque component Cesnf in phase through the phase adjusting means 22 at step Q6, the output is converted to a demanded amount of engine torque reduction Atrq through the torque conversion means 23 at step Q7. This conversion is performed by multiplying the resonant frequency torque component Cesnf by a specified conversion factor. In order to accomplish the torque reduction control for the amount of torque reduction, correction values for retarding the ignition timing and reducing an amount of fuel injection that that are necessary to cause the demanded amount of torque reduction are determined by referring a prescribed map that defines ignition timings and amounts of fuel injection with respect to amounts of torque reduction. At step Q10, the control of torque reduction is implemented at the specified torque reduction timing so as to cause the demanded amount of torque reduction.

In this instance, in the case where the transmission 16 is of a continuously variable type, after converting a resonant frequency torque component Cesnf to an amount of torque reduction at step Q7, a judgment is made at step Q8 as to whether there is a change in gear ratio in the continuously variable transmission. When a change in gear ration occurs, the amount of torque reduction is correctively made smaller by an amount meeting inertia occurring in the continuously variable transmission due to a gear shift (i.e. the change in gear ratio). In other words, a loss of engine torque that expectedly occurs due to the inertia is reckoned into the amount of torque reduction. The amount of torque meeting the inertia can be calculated by multiplying a ratio of a gear ratio change relative to a rotational speed of engine by a conversion factor. When there is no change in gear ratio at step Q8 or after having changed the amount of torque reduction smaller at step Q9, the control of torque reduction is implemented.

Figure 6:
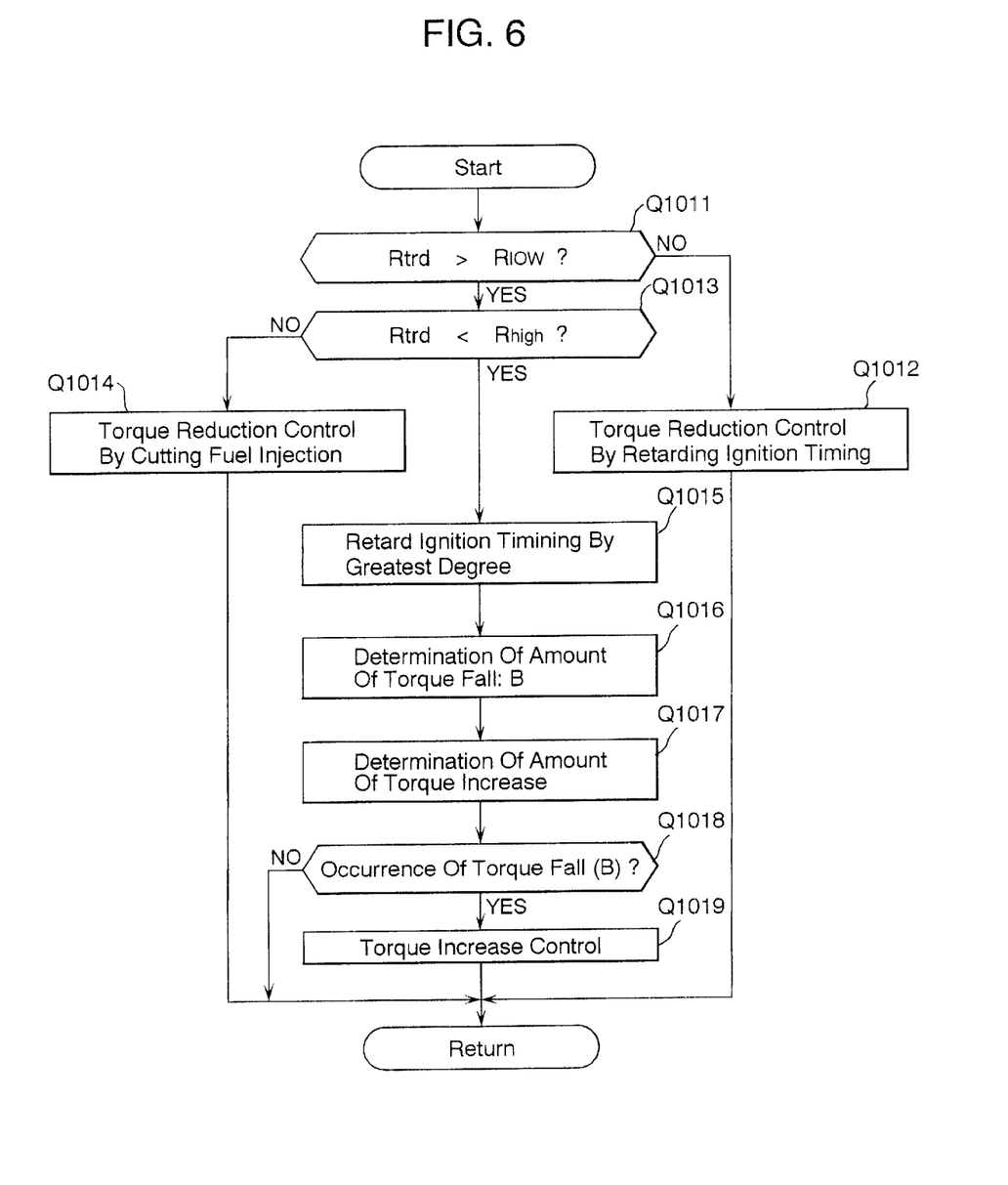
FIG. 6 is a flow chart illustrating a sub-routine of torque reduction control that is implemented in the general routine of torque reduction control.

FIG. 6 is a flow chart illustrating a sub-routine of the torque reduction control implemented at step Q10 of the main-routine of the torque reduction control. When the sequence logic commences and control proceeds to a function block at step Q1011 where a judgment is made as to whether an amount of torque reduction (a torque reduction rate Rtrd in this embodiment) is greater than a lower threshold rate $R_{low}$ that is 30% in this embodiment When the answer is negative, i.e. the torque reduction rate Rtrd is less than 30%, then, the torque reduction control is performed by retarding an ignition timing at step Q1012. On the other hand, when the answer is affirmative, i.e. the torque reduction rate Rtrd is greater than 30%, then, another judgment is made at step Q1013 as to whether the torque reduction rate Rtrd is smaller than an upper threshold rate $R_{high}$ that is 70% in this embodiment. When the answer is negative, i.e. the torque reduction rate Rtrd is greater than 70%, then, the torque reduction control is performed by cutting fuel injection at step Q1014.

Further, when the answer is affirmative, i.e. the torque reduction rate Rtrd is smaller than 70%, this indicates that the torque reduction rate Rtrd is between the lower and upper threshold rates $R_{low}$ and $R_{high}$, i.e. between 30% and 70%, then, at step Q1015, the ignition timing is changed by the greatest degree of retardation that is allowed without causing a misfire. Subsequently, at step Q1016, a calculation is made of an amount of torque fall B (see FIG. 2) that is desired to be made up. This torque fall may be set to an amount according to the demanded amount of torque reduction, for example 70% of the demanded amount of torque reduction. At step Q1017, a calculation is further made to determine an amount of torque increase corresponding to the torque fall. This amount of torque increase can be given in the form of an increase in the amount of intake air or an increase in the amount of fuel injection. After waiting an occurrence of a torque fall B following a first significant torque rise A (see FIG. 2) at step Q1018, the torque increase control is performed at step Q1019.

In this instance, the amount of torque increase is determined as a difference obtained by subtracting the amount of torque reduction that is provided by changing the ignition timing by the greatest degree of retardation from the demanded amount of torque reduction. That is, since the amount of the first torque rise is made small, not sufficiently but significantly, the second torque rise is smaller than that in the case where the ignition timing is not retarded. In consequence, in order to prevent an amount of torque increase from being set undesirably too large, it is desirable that the amount of torque reduction by which the reduction is short when the torque reduction control is performed by only retarding an ignition timing.

Figure 7:
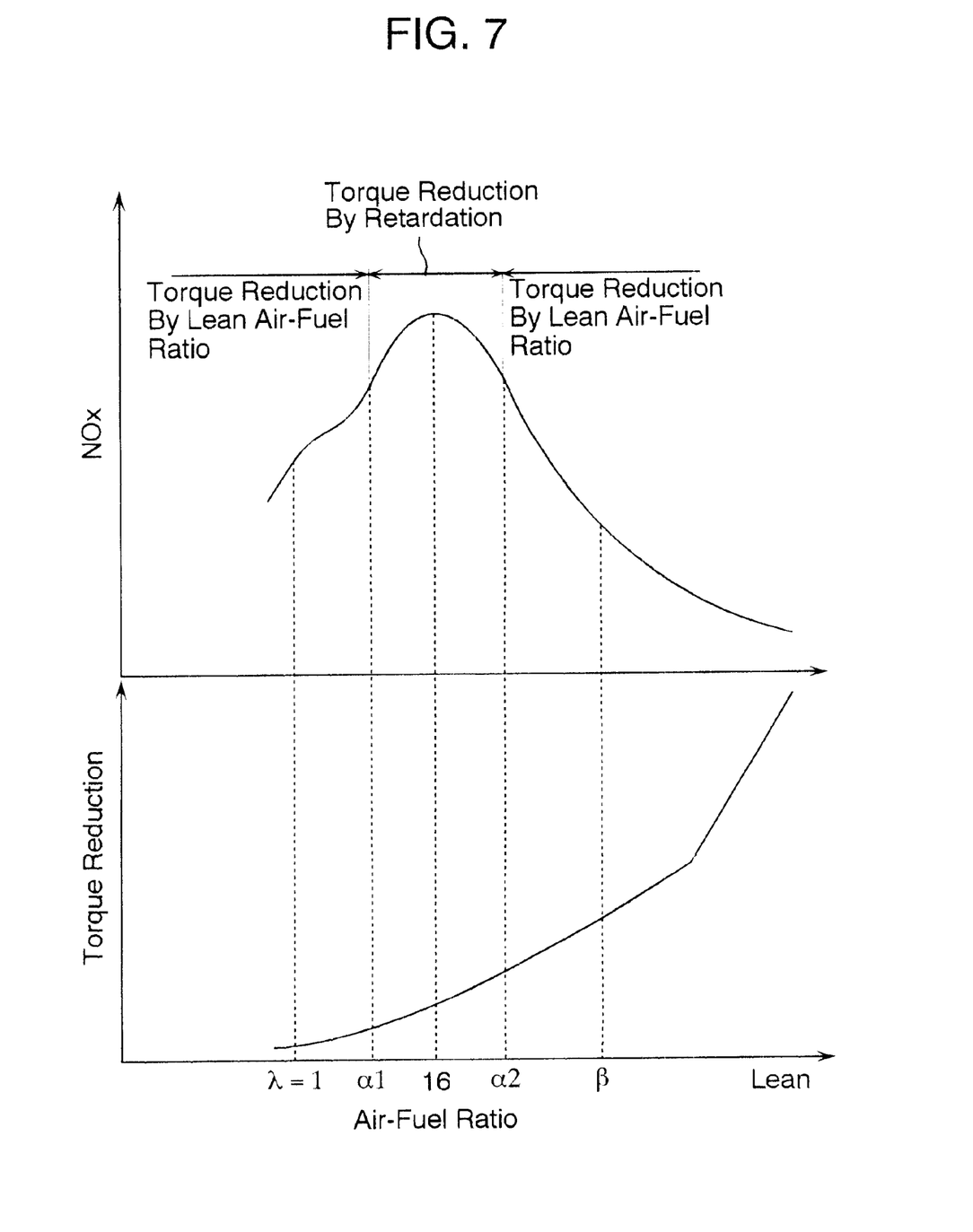
FIG. 7 is a diagram showing engine torque after the torque reduction control that is achieved by making an air-fuel ratio leaner.

FIG. 7 is a graph for explaining another embodiment of the control of torque reduction that is implemented at step Q10 of the main-routine of the torque reduction control shown in FIG. 4. In this embodiment, the torque reduction is caused though both making an air-fuel ratio leaner and retarding an ignition timing.

Shown in FIG. 7 are a change in the amount of torque reduction and a change in the level of NOx emission with a change in air-fuel ratio toward a leaner side. As apparent, the amount of torque reduction becomes larger as an air-fuel ratio varies toward a leaner side and, on the other hand, the level of NOx emission reaches a peak at an air-fuel ratio of approximately 16 and falls as an air-fuel ratio varies on each of leaner and richer sides from the air-fuel ratio of approximately 16. There are established two specific air-fuel ratios greater than a stoichiometric air-fuel ratio, namely a first specific air-fuel ratio $\alpha 1$ on the richer side from 16 and a second specific air-fuel ratio $\alpha 2$ on the leaner side from 16. These specific air-fuel ratio $\alpha 1$ and $\alpha 2$ are such that levels of NOx emission are at the same specific level at both the first and second specific air-fuel ratios $\alpha 1$ and $\alpha 2$. In other words, a NOx emission is at a level higher than the specific level in a specific range of air-fuel ratio between $\alpha 1$ and $\alpha 2$. While an air-fuel ratio is within the specific range of air-fuel ratio between $\alpha 1$ and $\alpha 2$, the torque reduction control is performed by only retarding an ignition timing without making an air-fuel ratio leaner. On the other hand, while an air-fuel ratio is out of the specific range of air-fuel ratio between $\alpha 1$ and $\alpha 2$, in other words, when an air-fuel ratio after having made leaner is either on the richer side from the first specific air-fuel ratio $\alpha 1$ or on the leaner side from the second specific air-fuel ratio $\alpha 2$, the torque reduction control is performed by only making an air-fuel ratio leaner without retarding an ignition timing.

There is established a further specific air-fuel ratio, namely a third specific air-fuel ratio $\beta$ that is greater or on the leaner side from the than the second specific air-fuel ratio $\alpha 2$. The third specific air-fuel ratio $\beta$ is the limit to a change in air-fuel ratio toward the leaner side. Even if an air-fuel ratio is made leaner beyond the limit, i.e. the third specific air-fuel ratio $\beta$, it is difficult to increase an amount of torque reduction while fuel combustion is reliably maintained. When an air-fuel ratio after having theoretically made leaner for a demanded amount of torque reduction is higher than the third specific air-fuel ratio $\beta$, the air-fuel ratio is practically fixed to the third specific air-fuel ratio $\beta$. Simultaneously, an ignition timing is retarded so as to make up a shortage of torque reduction resulting from fixing the air-fuel ratio to the third specific air-fuel ratio $\beta$.

Figure 8:
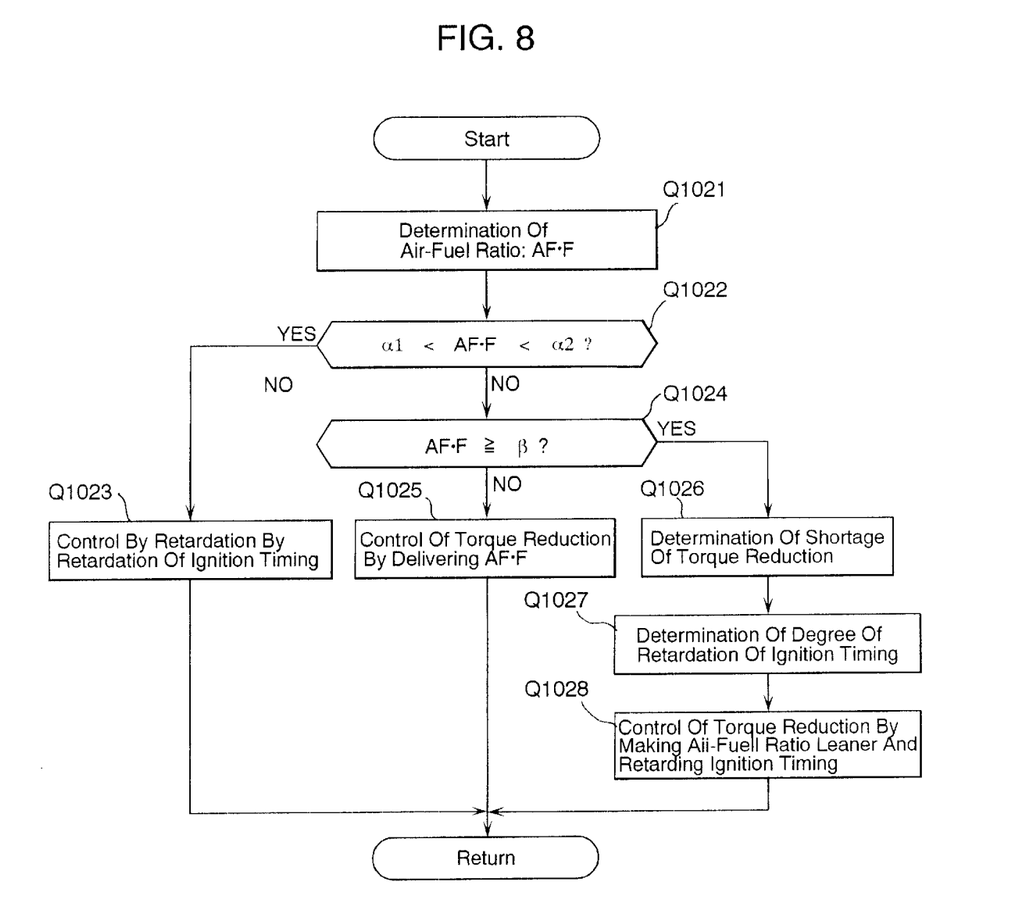
FIG. 8 is a flow chart illustrating another sub-routine of torque reduction control that is implemented in the general routine of torque reduction control.

FIG. 8 is a flow chart illustrating a sequence routine of the torque reduction control according to the embodiment briefly described above with reference to FIG. 7. When the sequence logic commences and control proceeds to a function at step Q1021 where a determination is made of an air-fuel ratio AF F after having been made as lean as necessary to cause the demanded amount of torque reduction by only making an air-fuel ratio leaner. Subsequently, at step Q1022, a judgment is made as to whether the air-fuel ratio AF F is within the specific range of air-fuel ratio between $\alpha 1$ and $\alpha 2$. When the answer is affirmative, i.e. when the air-fuel ratio AF F is within the specific range of air-fuel ratio between $\alpha 1$ and $\alpha 2$, the control of torque reduction is performed by only retarding the ignition timing at step Q1023.

On the other hand, when the answer is negative, i.e. when the air-fuel ratio AF F is out of the specific range of air-fuel ratio between $\alpha 1$ and $\alpha 2$, another judgment is made at step Q1024 as to whether the air-fuel ratio AF F is equal to or higher than the third specific air-fuel ratio $\beta$. When the answer is negative, i.e. when the air-fuel ratio AF F is lower than the third specific air-fuel ratio $\beta$, the control of torque reduction is performed by only delivering the air-fuel ratio AF F at step Q1025. On the other hand, when the answer is affirmative, i.e. when the air-fuel ratio AF F is equal to or higher than the third specific air-fuel ratio $\beta$, a calculation is made at step Q1026 to determine a shortage of torque reduction that is a difference of an amount of torque reduction for the third specific air-fuel ratio $\beta$ from the demanded amount of torque reduction. A calculation is further made at step Q1027 to determine a degree of retardation of an ignition timing that is necessary to make up the shortage of torque reduction. Subsequently, at step Q1028, the torque reduction control is performed by both making an air-fuel ratio leaner to the third specific air-fuel ratio $\beta$ and changing an ignition timing by the degree of retardation.

In this instance, in the event where the total amount of torque reduction resulting from making an air-fuel ratio leaner and retarding an ignition timing is less than a demanded amount of torque reduction, the torque reduction control may be performed by only cutting fuel injection. Further, when an air-fuel ratio AF F after having been made leaner is lower or richer than the second specific air-fuel ratio $\alpha 2$, the torque reduction control may be always performed by only retarding an ignition timing.

The torque reduction control may be performed by only retarding an ignition timing when a demanded amount of torque reduction is comparatively small or when an air-fuel ratio is lower or richer than the first specific air-fuel ratio $\alpha 1$, by only cutting fuel injection when a demanded amount of torque reduction is comparatively large or when an air-fuel ratio is greater or leaner than the second specific air-fuel ratio $\alpha 2$, and by making an air-fuel ratio leaner in combination, if desirable, with retarding an ignition timing when the air-fuel ratio is between the first and second air-fuel ratios $\alpha 1$ and $\alpha 2$.

Although the present invention has been described in connection with the preferred embodiments thereof, it will be appreciated that variants and other embodiments can be effected by person of ordinary skill in the art without departing from the scope of the invention. The control system can be installed in various engines regardless of types including, for example, a V-type engine, a diesel engine and a supercharged engine. Various physical quantities such as an amount of intake air, an accelerator opening, a throttle opening, a negative intake pressure and a flow rate of intake air may be employed and substituted for the value relating to an engine load.

What is claimed is:

1. An engine control system for controlling an internal combustion engine mounted on a vehicle, said engine control system comprising:

throttle opening detection means for detecting a throttle opening of the engine;

rotational speed detection means for detecting a rotational speed of the engine;

prediction means for predicting an engine load and a change in said engine load with time in a specified period of time from an occurrence of driver's operation for causing an increase in throttle opening on the basis of said throttle opening and said rotational speed when said occurrence of driver's operation is detected on the basis of a result of detection by said throttle opening detection means;

filter means for extracting a resonant frequency component that is coincide with a resonant frequency of a driveline of the vehicle from of said change in engine load predicted by said prediction means; and torque control means for performing torque reduction control which reduces engine torque by an amount meeting said resonant frequency component at a torque reduction timing corresponding to an occurrence of said resonant frequency component.

2. The engine control system as defined in claim 1, wherein said torque reduction timing is changed according to said rotational sped of engine.

3. The engine control system as defined in claim 2, wherein said torque reduction timing is changed by a degree of advance that is made greater with a drop in said rotational speed of engine.

4. The engine control system as defined in claim 1, wherein said torque control means interrupts said torque reduction control when said engine load is lower than a specified value.

5. The engine control system as defined in claim 1, wherein said driveline has a continuously variable transmission and said torque control means diminishes a demanded amount of engine torque reduction meeting inertia in said continuously variable transmission when said continuously variable transmission varies a gear ratio thereof.

6. The engine control system as defined in claim 1, wherein said torque control means performs said torque reduction control by retarding an ignition timing when said demanded amount of engine torque reduction is smaller than a first specified amount, performs said torque reduction control by cutting fuel injection when said demanded amount of engine torque reduction is larger than a second specified amount that is larger than said first specified amount, and performs said torque reduction control at said torque reduction timing by only retarding said ignition timing and further causes an increases in engine torque at a timing later than said torque reduction timing so as to diminish an engine torque fall occurring immediately after an engine torque rise occurring due to said resonant frequency component when said demanded amount of engine torque reduction is between said first and said second specified amount.

7. The engine control system as defined in claim 6, wherein said torque control means performs said torque reduction control by changing said ignition timing by a greatest degree of retardation that is allowed without causing a misfire when said demanded amount of engine torque reduction is between said first and said second specified amount.

8. The engine control system as defined in claim 7, wherein said torque control means causes an increases in engine torque meeting a difference of a demanded amount of engine torque reduction resulting from changing said ignition timing by said greatest degree of retardation from said demanded amount of engine torque reduction meeting said resonant frequency component.

9. The engine control system as defined in claim 1, wherein said torque control means achieves said demanded amount of engine torque reduction meeting said resonant frequency component by making an air-fuel ratio leaner when an air-fuel ratio after having been made as lean as necessary to cause said demanded amount of engine torque reduction is out of a specific range of air-fuel ratio for a level of NOx emission in an exhaust gas higher than a specified level and, on the other hand and by retarding an ignition timing when said air-fuel ratio after having been made as lean as necessary to cause said demanded amount of engine torque reduction is within said specific range of air-fuel ratio.

10. The engine control system as defined in claim 8, wherein said torque control means performs said torque reduction control with a specific air-fuel ratio on a leaner side from said specific range of air-fuel ratio when said air-fuel ratio after having been made as lean as necessary to cause said demanded amount of engine torque reduction is leaner than said specified air-fuel ratio and, when said torque reduction control with said specific air-fuel ratio causes a shortage of engine torque reduction relative to said demanded amount of engine torque reduction, further performs said torque reduction control by retarding an ignition timing so as to make up said shortage of engine torque reduction.

11. The engine control system as defined in claim 10, wherein said torque control means performs said torque reduction control by cutting fuel injection when a total amount of engine torque reduction of said amounts of engine torque reduction resulting from both said torque reduction control by using said specific air-fuel ratio and said torque reduction control by retarding an ignition timing is smaller than said demanded amount of engine torque reduction.

12. An engine control system for controlling an internal combustion engine mounted on a vehicle, said engine control system comprising:

a throttle opening sensor for detecting a throttle opening of a throttle valve;

a rotational speed sensor for detecting a rotational speed of the engine; and a control unit operative to control a fuel injector on the basis of said throttle opening and said rotational speed;

wherein said control unit predicts an engine load and a change in (said) engine load with time in a specified period of time from an occurrence of driver's operation for causing an increase in throttle opening on the basis of said throttle opening and said rotational speed when said occurrence of driver's operation is detected on the basis of a result of detection by said throttle opening sensor; extracts a resonant frequency component that is coincide with a resonant frequency of a driveline of the vehicle from of said change in engine load predicted, and controlling said fuel injector so as to reduce engine torque by an amount meeting said resonant frequency component at a torque reduction timing corresponding to an occurrence of said resonant frequency component.

* * * * *